United States Patent [19]

Yamada

[11] Patent Number: 4,553,755
[45] Date of Patent: Nov. 19, 1985

[54] GOLF CLUB HEAD

[75] Inventor: Magoichi Yamada, Tokyo, Japan

[73] Assignee: Daiwa Golf Co., Ltd., Kurume, Japan

[21] Appl. No.: 570,783

[22] Filed: Jan. 16, 1984

[30] Foreign Application Priority Data

Jan. 28, 1983 [JP] Japan ............................ 58-10872[U]
Jan. 28, 1983 [JP] Japan ............................ 58-10873[U]

[51] Int. Cl.⁴ ............................................... A63B 53/04
[52] U.S. Cl. ................................ 273/171; 273/167 A; 273/167 F
[58] Field of Search .......... 273/167 R, 167 A, 167 F, 273/167 H, 169, 171, 172, 173; D21/214, 215, 216

[56] References Cited

U.S. PATENT DOCUMENTS

| | | | |
|---|---|---|---|
| 2,534,947 | 12/1950 | Bright | 273/171 |
| 3,556,533 | 1/1971 | Hollis | 273/171 |
| 3,976,299 | 8/1976 | Lawrence et al. | 273/171 |
| 4,417,731 | 11/1983 | Yamada | 273/167 H |
| 4,438,931 | 3/1984 | Motomiya | 273/167 H |

*Primary Examiner*—Richard C. Pinkham
*Assistant Examiner*—Vincent A. Mosconi
*Attorney, Agent, or Firm*—Fred Flam

[57] ABSTRACT

A golf head body made as a casting of plastic or metal has a large cavity. A sole plate is attached to close the cavity. The parts are carefully finished by grinding and polishing prior to injection of foamable plastic. The cavity has a special configuration to provide fill holes that are independent of the sole plate. The mechanical strength of the club and installed shaft is not compromised; the foamable plastic, injected after finishing, is not affected by any heat generated by the finishing of the sole plate.

2 Claims, 10 Drawing Figures

GOLF CLUB HEAD

FIELD OF INVENTION

This invention relates to golf club heads for drivers or "woods" which are made of light weight molded plastic or aluminum alloys such as shown and described in my copending applications Ser. Nos. 06/515,379 and 06/552,757 filed on July 18, 1983 and Nov. 17, 1983, both entitled GOLF CLUB HEAD. More particularly, this invention relates to a golf club head of this type having a cavity filled with plastic material and having means for achieving proper weight distribution.

BACKGROUND OF THE INVENTION

Golf club heads for "woods" or "drivers" are now commonly made of molded plastic materials with reinforcement fibers or of cast light weight aluminum or other metals. Such clubs have largely superseded natural wood materials such as persimmon or cherry for reasons including stability and availability of materials.

However, the specific gravities of such cast or molded materials are significantly greater than that of persimmon, for example. Therefore, in order to simulate the appearance and weight of a club head made of natural persimmon, the golf club head is provided with a large cavity that opens at the sole. In order to prevent ingress of moisture and for other reasons, the cavity is sealed by filling it with a plastic, such as polyurethane, foamed in suit. The plastic is confined during the foaming and molding process by a sole plate firmly attached to seal the cavity. Typically, the plastic is injected into the cavity via the shaft mounting socket or hosel provided at the neck of the head.

The use of the mounting socket for such purpose often distorts and enlarges about the edge located at the junction of the inner end of hosel and the cavity. The connection between the shaft and the club head is thereby significantly weakened, especially since the inner end of the shaft is not surrounded by a solid, unitary mass as in a conventional club head. Moreover, the lack of a secure connection reduces the sensation of impact transmitted from the club head back to the grip and the golfer's hands.

Apart from the fact that the hole edge may be mutilated and enlarged, the surface of the hole is disturbed when hardened plastic is removed preparatory to shaft installation. Such reconditioning of the hole results in poor adhesion between the plastic and the shaft. Moreover, the removal of the hardened plastic remnants is cumbersome and tedious.

One proposed solution, described in Japanese Patent Laid-Open No. 51-106528, is to fix the sole plate temporarily while injecting foaming plastic through a tapped hole and thereafter installing a screw to close the fill hole. This system creates certain problems due to the necessary sequence of steps. Thus the depth of the peripheral step on which the sole plate is mounted varies due to the molding process, for which reason a finishing operation is required. The sole plate must be cut or ground away to achieve continuity between the sole plate and the body of the club head. Grinding creates heat which melts the foamed plastic, redistributing its mass and creating voids. The tapped hole may be fouled, preventing proper attachment of the screw. Control of toe to heel and other weight relationships requires calculated changes in the capacity and configuration of the cavity.

SUMMARY OF INVENTION

In order to overcome the foregoing problems, I permanently fix the sole plate to the club head body and finish it prior to injecting foamable plastic into the cavity. This is made possible by a special configuration of the cavity and by the provision of one or more fill holes for the cavity that are independent of the sole plate. Accordingly, the mechanical strength of the club head is not compromised, nor are special compensating procedures required after the plastic first foams and hardens. Furthermore, weight adjustment and balance are easily accomplished. The entire process of making a club head of this type yields consistent and predictable results.

BRIEF DESCRIPTION OF THE DRAWINGS

A detailed description of the invention will be made with reference to the accompanying drawings wherein like numerals designate corresponding parts in the several figures.

DETAILED DESCRIPTION OF FIRST EMBODIMENT

The following detailed description is of the best presently contemplated mode of carrying out the invention. This description is not to be taken in a limiting sense, but is made merely for purposes of illustrating the general principles of the invention, the scope of the invention being best defined by the appended claims.

Structural and operational characteristics attributed to forms of the invention first described shall also be attributed to forms later described, unless such characteristics are obviously inapplicable or unless specific exception is made.

Figure 1:
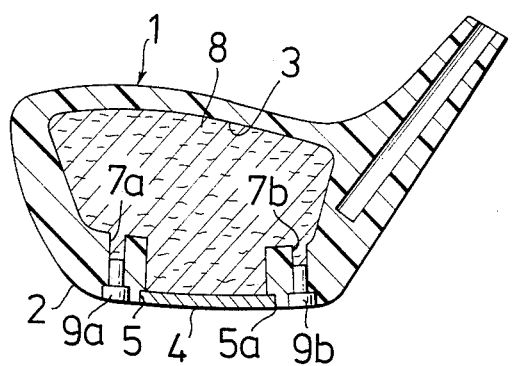
FIG. 1 is a vertical sectional view of a club head incorporating the present invention.

In FIG. 1 there is illustrated a molded club head 1 made of a light weight metal such as aluminum or of plastic material having fiber reinforcements such as carbon. The club head is formed with a large cavity 3 that opens on the bottom or sole 2. This cavity is designed to compensate for the relatively high specific gravity of the material of which the club head is made, and has a configuration to determine a proper balance or distribution of weight.

Figure 2:
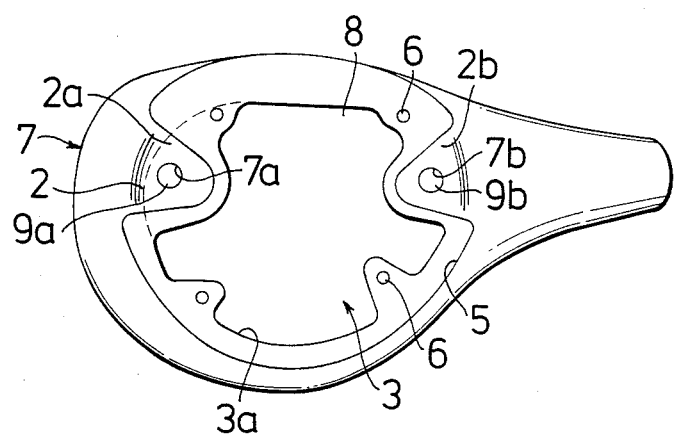
FIG. 2 is a bottom plan view thereof, but with the sole plate removed.

The opening 3a of the cavity 3 at the sole plate is irregularly formed as shown in FIG. 2. At the region of the club toe 2a, a lobe of the sole protrudes inwardly. As shown in dotted lines, this lobe underlies a forward or frontal or toe portion of the cavity 3. (See also, FIG. 1.) At the region of the club heel 2b, a lobe of the sole similarly protrudes inwardly. As shown in FIG. 1, this lobe underlies a rearwardly extending or heel portion of the cavity 3.

Ledges or steps 5 are formed on opposite sides of the lobes in order to provide suitable mounting areas for the sole plate 4 fitted thereto. The sole plate 4 is reduced in dimension in order to fit inside the toe and heel lobes.

The sole plate 4 perfectly closes the opening 3a, and is secured in position by the aid of screws (not visible in FIG. 1) that engage holes 6 (four in this instance) at the ledges or steps 5. The screws are preferably self-tapping.

Before the screws are finally set, a perfectly flush and fitted relationship between the sole plate and the club sole 2 is achieved by grinding and polishing the areas 5 and/or the sole plate 4. This operation compensates for minor irregularities resulting from molding. The sole plate is then finally attached.

After the sole plate 4 is so finished and attached, foamable plastic is injected into the cavity 3. For this purpose, the toe and heel lobes are provided with fill holes 7a and 7b respectively that adequately communicate with the undercut portions of the cavity 3. These fill holes 7a and 7b are formed during the process of molding the head 1. Either or both fill holes may be used for injection of plastic. One of the fill holes serves as a vent so that all air is purged during the filling process and so that the plastic completely fills the cavity 3. The plastic cures and hardens at room temperature (20 to 25 degrees Centigrade). The exact position of the fill holes on the sole 2 (except the sole plate 4) is not critical. Small plugs or other suitable closures 9a and 9b are finally installed at the fill holes 7a and 7b.

Since the injection of foamable plastic takes place after the sole plate 4 is finished and finally attached, the heat generated during the sole plate finishing process has no effect upon the foamed plastic. There is no danger of this foamed plastic remelting. The hosel is entirely undisturbed by the process of foam plastic injection, and its finish is maintained for reception of the shaft.

DESCRIPTION OF SECOND EMBODIMENT

Figure 3:
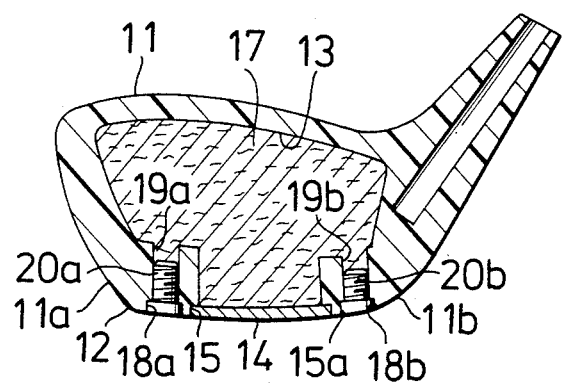
FIGS. 3 and 4 are views similar to FIGS. 1 and 2, but illustrating a second embodiment of the present invention.
Figure 4:
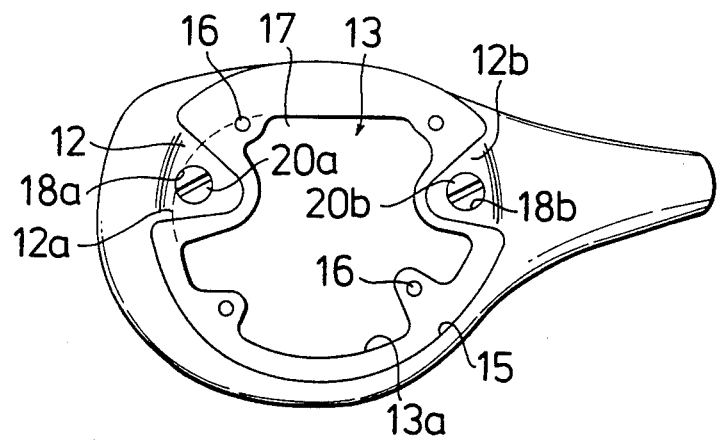

In the form illustrated in FIGS. 3 and 4, a molded club head 11 is provided as before. The head 11 has a cavity 13 having an opening 13a at the sole 12 of the club head. A sole plate 14 fits steps or ledges 15 formed at the edges of the opening 13a on opposite sides of lobes at the toe and heel 12a and 12b. Holes 16 are provided for screws (not shown).

The fill holes 19a and 19b are provided as before at the toe and heel lobes. Foamed plastic 17 fills the cavity 13.

Figure 5A:
FIGS. 5a-c and 6a-c are composite elevational views of weight adjusting screws for use with the club heads.
Figure 5B:
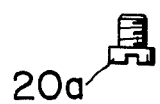
Figure 5C:
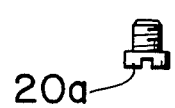
Figure 6A:
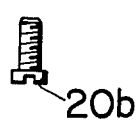
Figure 6B:
Figure 6C:

In the present embodiment the outer ends 18a and 18b of the fill holes serve removably to mount weights in the form of self-tapping flat head screws 20a and 20b. These screws 20a and 20b are selected for size (FIGS. 5 and 6) as well as for material. Weights "a" and "b" may be made of brass, and weights "c" of aluminum. Thus three different weights are shown for each fill hole, graduated from heaviest ("a") to lightest ("c"). The toe to heel weight distribution is adjusted to the golfer as well as the combined weight.

Intending to claim all novel features shown or described, I claim:

1. A golf club head:
   (a) a golf club head body made of molded material having a specific gravity that is large relative to conventional wood materials, said body having a large weight compensating central cavity opening at the sole of said body;
   (b) said body having toe and heel lobes that protrude inwardly there to reduce the cavity opening, said cavity overlying said toe and heel lobes;
   (c) said body having stepped portions between said lobes to provide mounting areas for a sole plate;
   (d) a sole plate fitted to the cavity opening at said sole, seated on said areas and fitted around said lobes;
   (e) said lobes having fill holes for injection of foamable plastic into said cavity and for purging of air during the molding process, said fill holes being independent of said sole plate whereby finishing of said sole plate can be achieved before injection of foamable plastic;
   (f) foamed plastic entirely filling said cavity;
   (g) removable plugs for said fill holes; and
   (h) said golf club head body having a hosel out of communication with said cavity.

2. The golf club head as set forth in claim 1 in which the size and specific gravity of said plugs are selected to achieve weight calibration thereof.

* * * * *